H. CONDERMAN
Fifth Wheel.

No. 62,253 — Patented Feb. 19, 1867.

Witnesses:
C. M. Alexander
J. M. Mason

Inventor:
Hiram Conderman

United States Patent Office.

HIRAM CONDERMAN, OF HASKINVILLE, NEW YORK.

Letters Patent No. 62,253, dated February 19, 1867.

---

IMPROVEMENT IN COUPLING FOR CARRIAGES.

---

The Schedule referred to in these Letters Patent and making part of the same.

---

TO ALL WHOM IT MAY CONCERN:

Be it known that I, HIRAM CONDERMAN, of Haskinville, in the county of Steuben, and in the State of New York, have invented certain new and useful Improvements in the Construction of Carriages; and do hereby declare that the following is a full, clear, and exact description thereof, reference being had to the accompanying drawings, and to the letters of reference marked thereon.

Figure 1:
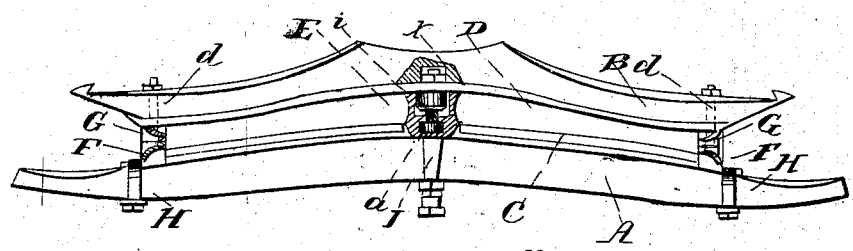
Figure 2:
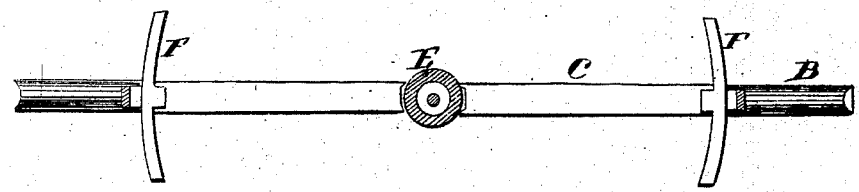
Figure 2:
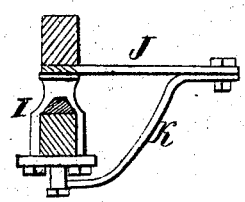

In the annexed drawings, making part of this specification, A represents the bed-piece of the axle of a vehicle, and B the head-block. Upon the bed-piece A is secured, by means of clips, H H and I, a metallic bar, C. Near the outer ends of the bar C are formed two sections of the fifth wheels ordinarily used upon vehicles, and marked F F. Upon the centre of the bar C is formed an annular box, E, which is secured to the bed-piece A by means of the clip I. D represents a metallic bar, which is secured to the under side of the head-block B. Upon the outer ends of the bar D are sections, G G, of the fifth wheel, which is secured to said bar and to the head-block B by means of screws, $d\ d$. The sections G G fit and play upon the sections F F, as seen fig. 1. Formed upon the bar D, on its under side and at its centre, is a pin or pivot, $i$, which is made large enough to fit snugly in the annular box E. A small bolt, $a$, passes up through the bottom of the box E and through an opening in the centre of the pivot $i$. $x$ represents a nut, which passes over the upper end of bolt $a$, and serves to confine the head-block, with its bar, to the bed-piece. The pivot $i$ turns in the box E when the direction of the vehicle is changed, and bears all the strain usually borne by the ordinary king-bolt. J represents a metallic bar, and K the ordinary goose-neck, which connect to the perch-poles of the vehicle. By this arrangement it will be seen that I do away with a king-bolt and avoid the necessity of having a hole in the axle, bed-piece, and head-block, and that thus a vehicle can be made much stronger and more durable than in the old way.

Having thus fully described my invention, what I claim as new, and desire to secure by Letters Patent, is—

The bar C, provided with the sections F F and annular box E, when used in combination with the bed-piece A, as and for the purpose specified.

In testimony that I claim the foregoing I have hereunto set my hand and seal this third day of January, 1867.

HIRAM CONDERMAN.

Witnesses:
C. M. ALEXANDER,
J. M. MASON.